United States Patent [19]

Kantor et al.

[11] Patent Number: 4,681,424
[45] Date of Patent: Jul. 21, 1987

[54] COMPENSATION FOR FINE LINE PRINTS

[75] Inventors: Sherwood Kantor, Boulder; Garry J. Selby, Longmont; Larry L. Wolfe, Broomfield, all of Colo.

[73] Assignee: IBM Corporation, Armonk, N.Y.

[21] Appl. No.: 864,985

[22] Filed: May 20, 1986

[51] Int. Cl.⁴ ............................................ G03G 15/00
[52] U.S. Cl. ................................ 355/14 R; 355/14 C; 355/14 E; 355/14 D; 364/515; 364/557
[58] Field of Search ................ 355/3 R, 14 R, 14 C, 355/14 E, 14 D, 3 DD; 364/515, 557; 219/216

[56] References Cited

U.S. PATENT DOCUMENTS

| | | | |
|---|---|---|---|
| 3,750,189 | 7/1973 | Fleischer | 346/74 ES |
| 4,259,565 | 3/1981 | Ogino et al. | 219/216 |
| 4,360,261 | 11/1982 | Kohyama | 355/14 E X |
| 4,373,802 | 2/1983 | Yuge et al. | 355/14 FU |
| 4,411,514 | 10/1983 | Komori et al. | 355/14 E X |
| 4,538,895 | 9/1985 | Higgins et al. | 355/3 R |
| 4,544,264 | 10/1985 | Bassetti et al. | 355/14 R |
| 4,609,278 | 9/1986 | Taniguchi | 355/14 FU X |

Primary Examiner—A. C. Prescott
Attorney, Agent, or Firm—Pollock, Vande Sande & Priddy

[57] ABSTRACT

In an electrophotographic printer or the like, compensation is provided for environmental effects (temperature, humidity, photoconductor aging, etc.) which would otherwise affect print quality. Analyzing print data allows identification of compensation locations; those are locations at which compensation is most critical, such as single pel lines. A series of clock pulses of varying phase displacement are employed, and selected based on environmental variations, so as to modify the print data at the identified compensation locations. The print data comprises a series of pulses. Compensation to control the width of lines perpendicular to the scan direction is effected by selectively advancing the leading edge of pulses defining a white/black transition and delaying the trailing edge of pulses defining the black/white transition. This control then affects the duration of the print pulses. For lines which are parallel to the scan direction width control is effected by adding gray pulses, both the leading and trailing edges of these gray pulses are controlled in accordance with environmental variations. Accordingly, the duration of the gray pulse is also controlled.

11 Claims, 8 Drawing Figures

FIG. 6

TIMING DIAGRAM FOR ENHANCEMENT PARAMETER SERVO CIRCUIT

PEL POSITION | 1 | 2 | 3 | 4 | 5 | 6 | 7 | 8 |
CK = PEL CLOCK
$\overline{CK}D$ = PEL CLOCK-DELAYED AND INVERTED
TD$\emptyset$ = CK · $\overline{CKD}$
TD1
TD2
TD3
TD4
TD5

S1 = GRAY PEL POSITION
S2 = GRAY ON = TD2 + S1
S3 = GRAY OFF = TD4 + S1
FF315 Q = GRAY PULSE

C = NORMAL DATA

237S = LEADING EDGE "ADDED BLACK" PEL POSITION

233S = TRAILING EDGE "ADDED BLACK" PEL POSITION

S6 = BLACK ON = 237S + TD4

S7 = BLACK OFF = 233S + TD2

FF312 Q = WIDENED BLACK PULSE

S8 = FF1Q · FF2Q · D = SERIAL DATA STREAM

COMPENSATION FOR FINE LINE PRINTS

DESCRIPTION

1. Field of the Invention

The invention relates to printing machines such as a laser electrophotographic printer and more specifically to a compensation for environmental effects (temperature, humidity, etc. or photoconductor aging) which would otherwise affect the print quality.

2. Related Inventions

U.S. Pat. No. 4,544,264 describes fine line print enhancement which identifies selected locations using pattern recognition techniques, and has the capability of widening fine lines, both parallel to and perpendicular to the scan direction using different techniques. More particularly, incoming data from the character generator is viewed by the enhancement circuit which analyzes the data and generates needed gray exposure and/or enlarged black pulses to provide for print enhancement in orthogonal directions.

Co-pending application Ser. No. 611,561, filed May 17, 1984 now U.S. Pat. No. 4,625,222 (assigned to the assignee of this application), the disclosure of which is incorporated by this reference, describes enhancing printing of diagonal lines, among other features.

3. Background Art

Many printing machines are designed to create an image by placing a series of picture elements (pels) on the image receiving material. For example, in electrophotographic printing machines, an image may be created by a light source which is caused to scan across photosensitive material in a succession of scan lines. The light beam places a series of overlapping pels on the charged surface of photosensitive material. Each pel is placed in a pel area and the light beam is modulated so that some pel areas are exposed to light and some are not. Wherever a pel containing light strikes the photosensitive material, it is discharged. In that manner, the photosensitive material is caused to bear a charge pattern of pels which images the subject that is being reproduced. The printed copy is obtained by developing the charge pattern and transferring the developed image to print material, usually paper.

The resolution of images produced by a laser electrophotographic machine is generally stated in the number of pels produced per inch. For example, a 300-pel per inch electrophotographic printer has higher resolution than a 240-pel per inch printer. While the visual characteristics of print are generally better when a higher number of bels per inch are used, in one area the visual characteristics are made worse. That area is the printing of narrow fine lines, for example, lines of a single pel width. The reason is that as the number of pels per inche increase, the width of a single pel decreases. This decrease in pel width is made even more severe by the overlapping pel structure used in electrophotographic printing machines. The invention in the '264 patent is an apparatus and technique for enhancing the printing of fine lines such as lines of a single pel width and provides for such enhancement in two dimensions. To achieve this effect the apparatus shown in the '264 patent identifies, using logic analysis of the incoming print data, three specific locations:

(1) the location of desirable graph exposures,
(2) a location leading selected white/black transitions, and
(3) a location trailing selected black/white transitions.

The enhancement occurs by modifying the print data at the identified locations. More particularly, if at location 1, we duty cycle modulate the laser the resulting image takes on the appearance of a black pel of smaller size (than the standard pel) at this location; this has the effect of widening otherwise fine lines which are parallel to the scan direction. If at locations 2 and 3, we alter the print data so that the black leading edge occurs earlier than it otherwise would have occurred (at location 2) and the black trailing edge occurs later than it otherwise would have (at location 3) the resulting image widens fine lines which are perpendicular to the scan direction.

As will be described below, the same three locations can be used for other purposes, more particularly character stroke width control, to solve an entirely different problem and the problem solved by the invention of the '264 patent.

As described in the co-pending application, other locations can be selected for enhanced printing to enhance printing of diagonal lines. As will be described below, the quantum of such enhancement can be controlled in accordance with the present invention so as to maintain desired print enhancement.

When printing characters on a laser or LED exposed electrophotographic processor, stroke widths can vary by reason of what we will refer to as environmental variations; these include temperature, humidity, etc. as well as aging of the photoconductor itself (otherwise referred to as photoconductor fatigue). While all strokes are affected by such environmental variations, the effect is more noticeable in single pel stroke widths in that a small shift in the photoconductor residual voltage (caused by variations in any of these environmental conditions) can cause these already thin lines to become significantly more faint or washed out when operating in a discharge developed electrophotographic process. Conversely, in a charge developed process the spacing between single pel lines is reduced by reason of these environmental effects.

SUMMARY OF THE INVENTION

It is the purpose of the present invention to provide an apparatus and technique to modify either print data or enhanced print data (that is, data enhanced as described in the '264 patent) so as to provide for character stroke width control by either providing print compensation directly related to these environmental variations or by modifying the print enhancement generated for other purposes, to compensate for these environmental variations which would otherwise degrade print quality.

The effect of environmental variations (whether in ambient conditions or photoconductive fatigue) can be detected by monitoring the laser power required to attain a given residual voltage on the photoconductor. Thus by monitoring the laser power and modifying the print data or enhanced print data to compensate, character stroke widths can be compensated for print variations that would otherwise be caused by these environmental variations.

It is typical in electrophotographic printers employing lasers to generate a voltage reference corresponding to desired laser power; thus this reference corresponds to an analog signal (or an error signal) which is directly related to the environmental variations that must be compensated for. One of the components in accordance with the invention responds to changes in this voltage reference (or electrostatic probe voltage).

In accordance with the invention, those image locations which are suitable for compensation (either of print data or enhanced print data) are identified by using the same circuitry described in the '264 patent, that is, selected leading (white/black transitions), selected trailing (black/white transitions) and gray stroke positions.

In connection with lines perpendicular to the scan direction, the stroke width of these lines can be controlled or widened by adding black at the white/black and black/white transitions. The amount of added black is a fractional pel value in accordance with the reference signal and can be selected to yield the desired stroke width. Black strokes in some machines are generated when the laser is turned off, and in that event in order to increase the stroke width the laser is turned off sooner and back on later than the times that would be indicated in the raw print data (or the enhanced print data). Conversely, in other types of printers black strokes are generated when the laser is turned on. In order to increase when the laser is turned on. In order to increase the stroke width the laser is turned on sooner and back off later than the times would otherwise be indicated by the raw print data (or the enhanced print data).

Lines parallel to the scan direction are controlled in stroke width (or widened) by applying gray exposure values to the photoconductor. These gray exposure values are placed in pel areas adjacent to the black data and may be placed at both the white/black and black/white transitions. These gray exposure values are generated by duty cycle modulating the laser, that is the laser is turned off for a period of time shorter than the normal pel period. Conversely, the laser is turned on for a period of time shorter than the normal pel period. In either case the gray exposure signal is centered in its respective pel position (although other locations could also be used). Although termed a gray exposure, the resulting image has a reduced size black pel at the gray exposed locations.

As already mentioned, the location of the gray exposures and added black are determined by circuitry identical to the circuitry described for locating print enhancement in the '264 patent. In order to ensure compensation for environmental variations, the circuitry in accordance with the present invention, after identifying the desired locations, selects the values of the "added black" and the gray pulse widths in accordance with such environmental variations.

Thus, in accordance with the invention an apparatus is provided for modifying print data in an electrophotographic printer to compensate for environmental variations which would otherwise result in print quality variation, the apparatus comprises:
means for developing a series of clock pulses having varying phase displacement,
selector means responsive to the series of pulses and an adressing input for selecting and outputting selected of said pulses,
means responsive to a signal representing environmental variations for developing an addressing input for said selector means, and
logic means responsive to the print data signals and to the selected pulses for producing modified print data signals.

In another aspect, the invention provides an improved electrophotographic printer including stroke width control in at least one of the following respect:
1. widening a fine line parallel to a scan direction by generating non-data representing pulses to add an adjacent gray exposure, or
2. widening a fine line perpendicular to a scan direction by lengthening a print pulse at a leading edge, or
3. widening a fine line perpendicular to a scan direction by lengthening a print pulse at a trailing edge,
wherein the improvement comprises means for compensating for environmental variations including:
means for developing a series of clock pulses of varying phase displacement,
selector means responsive to said series of pulses and an addressing input for outputting selected of said pulses,
means responsive to a signal representing environmental variations for developing an addessing input for said selector means, and
logic means responsive to print data and to said selected pulses for producing modified print data compensated for said environmental variations.

BRIEF DESCRIPTION OF THE DRAWINGS

The present invention will now be further described in the following portions of the specification when taken in conjunction with the attached drawings in which like reference characters identify identical apparatus and in which:

FIG. 6 is a succession of timing diagrams which is useful in describing the operation of FIGS. 5A–5C.

DETAILED DESCRIPTION

Figure 1:
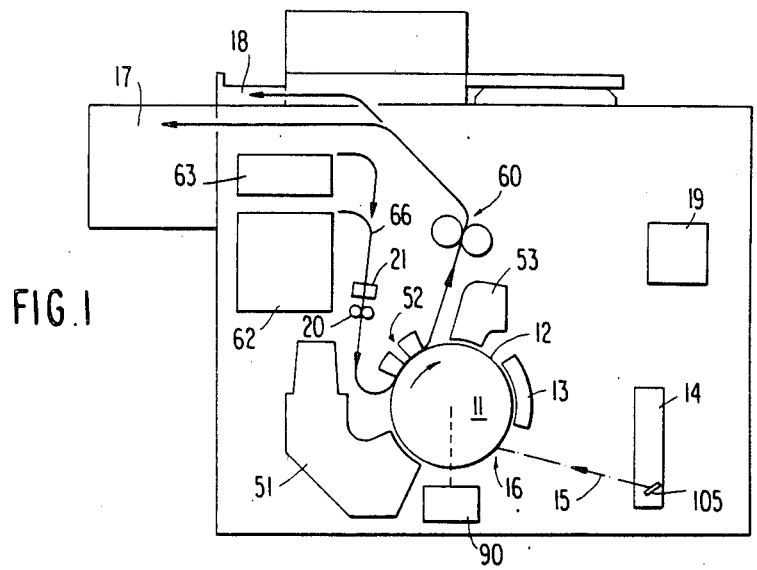
FIG. 1 shows a typical electrophotographic printing machine.

In electrophotographic printing machines, prints are produced by creating an electrostatic representation of the print on a photoreceptive surface, developing the image and then fusing the image to print material. In machines which utilize plain bond paper or other image receiving material not coated with photoreceptive material, the electrophotographic process is of the transfer type where the photoreceptive material is placed around a rotating drum or arranged as a belt to be driven by a system of rollers. In a typical transfer process, photoreceptive material is placed around a rotating drum or arranged as a belt to be driven by a system of rollers. In a typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays generated by a light source. In electrophotographic printing machines such as the IBM 6670 Information Distributor, positive images are produced through the use of light rays which discharge the photoreceptive material in white or background areas to relatively low levels while areas which are desired to print out as dark areas continue to carry high voltage levels after the exposure. In that manner, the photoreceptive material is caused to bear a positive charge pattern corresponding to the printing, shading, etc. which is desired. In the production of a negativie image used in machines such as the IBM 3800 Electrophotographic Printer, light rays are used to discharge the photoreceptive material in the foreground areas (dark areas).

After producing an image on the photoreceptor, the image is sent to a developing station where developing material called toner is placed on the image. This material may be in the form of a black powder or liquid and, in a system which produces a positive image, the material carries a charge opposite in polarity to the charge pattern on the photoreceptor. In a negative image system, the toner carries the same polarity as the charge on the photoreceptor. Because of the attraction of the charged toner to the photoreceptor, it adheres to the photoreceptor surface in proportions related to the shading of the image. Thus, black character printing receives heavy toner deposits and white background areas should receive none.

A developed image is moved from a developer to a transfer station where image receiving material, usually paper, is juxtaposed to the developed image on the photoreceptor. A charge is placed on the backside of the paper so that when the paper is stripped from the photoreceptor, the toner material is held on the paper and removed from the photoreceptor. The remaining process steps call for permanently bonding the transferred toner material to the paper and cleaning residual toner left on the photoreceptor after the transfer operation. Thereafter, the photoconductor is reused for subsequent print production.

A common variation on the above-described process used in many electrophotographic machines, involves the use of specially prepared image receiving material with itself is coated with a photosensitive material. By utilizing that technique, the image is electrostatically placed directly on the image receiving paper thereby avoiding the transfer operation. In this process, after exposure the paper is sent through a developer and then to a fuser for permanent bonding. Machines of this type avoid the residual toner problem and therefore avoid the need for cleaning stations. However, the resulting paper with its special photosensitive coating is more expensive than plain bond paper and special coating is considered to detract from the resulting product.

As a consequence, coated paper machines are usually used only for low volume applications or where quality product is not essential.

Production of the image on the photoreceptive surface can be produced by a scanning light beam where the desired characters are produced by driving a light generating source from information held in digital memory. The generating source may be a laser gun, an array of light-emitting diodes, etc. which direct light rays to the photoreceptor and cause it to bear the desired charge pattern.

An example of a light scanning and printing system such as is employed in the IBM 6670 Information Distributor is disclosed in U.S. Pat. No. 3,750,189. In that system, a laser beam is directed through a collimating lens system and focused as a line on a rotating mirror. The reflected beam is passed through a combination of a toroidal and a spherical lens to focus the line image on the final image plane, that is, the photoreceptor. The shape of the focused beam on the photoreceptor is designed to be slightly elliptical in order to compensate for the different image forming properties of the optical system in the scan and nonscan directions.

The type of light source provided in the IBM 6670 Information Distributor is a helium-neon laser generating source. This source provides a continuous laser beam which is modulated by an acousto-optic modulator to carry the digital information desired for reproduction. The current invention may be used with a helium-neon laser source but the particular implementation to be described herein is designed for use with a solid-state laser source. Modulation of a solid-state laser source is usually accomplished by switching the laser beam on and off in accordance with the digital information desired for reproduction. An optical system for use with a solid-state laser generating source is the subject of U.S. Pat. No. 4,538,895, dated Sept. 3, 1985. That patent application describes an optical system which includes an achromatic doublet lens positioned adjacent to the solid-state laser generating source together with an aperture located just prior to the achromatic doublet lens. The doublet lens collimates the beam and passes it to a cylindrical lens for focusing the beam onto the surface of a rotating mirror and then through a toroidal lens together with a spherical lens to focus the beam onto a moving photoreceptive surface.

Whether a continuous laser beam modulated by an acousto-optic modulator or a solid-state laser beam modulated by a switching circuit is used, the resultant image is formed by a series of overlapping picture elements, each picture element being small relatively circular dots placed adjacent to each other in an overlapping relationship. Adjacent pels overlap along each scan line and also overlap with adjacent pels on directly adjacent scan lines.

FIG. 1 shows a typical electrophotographic laser printing machine. An electrophotographic drum 11 is driven by motor 90 in direction A. Drum 11 carries photosensitive material 12 which passes under a charge corona generator 13 to charge the photoreceptive material to a suitable voltage. Next, the photoreceptive material 12 is discharged at exposure station 16 in accordance with the image desired to be reproduced. That image is produced by a module 14 consisting of a character generator and a laser printhead which produces the modulated laser beam 15. Next, the latent image is developed at the developer station 51 and transferred by a transfer corona generator 52 to image receiving material (typically copy paper) traversing the paper path 66. Photoreceptive material 12 then continues to the cleaning station 53 before repeating the cycle to receive another image. Copy paper may be stored in either bin 62 or 63 and fed into the paper path 66 to a gate 21. Copy paper is related by gate 21 and passed along the paper path through pinch rolls 20 through the transfer station 52 and on to the fusing rolls 60. The finished print is then passed to an exit pocket 18 or to a finishing station 17. Module 19 represents the control circuits which operate the machine in its intended manner and may be based on any suitable microprocessor or set of microprocessors.

Figure 2:
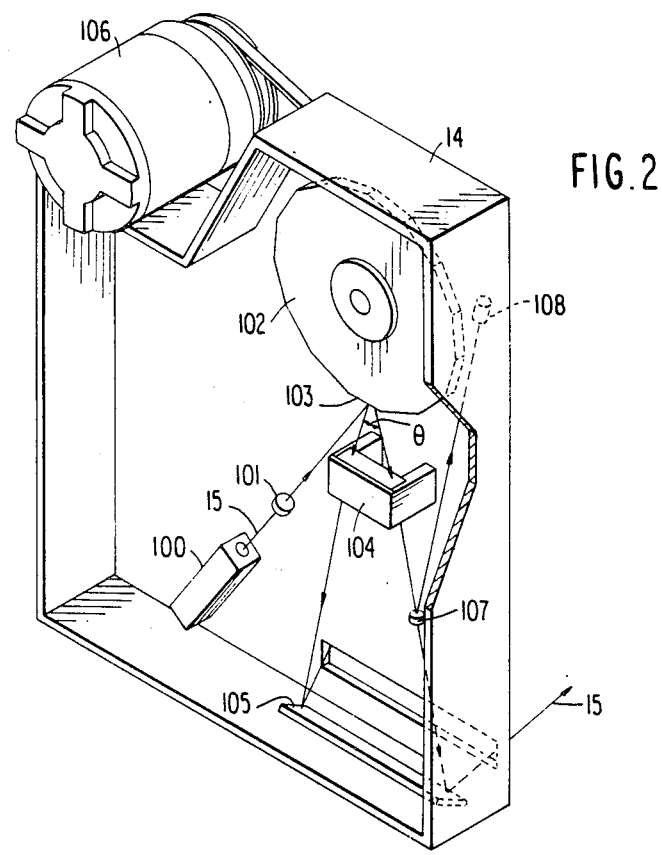
FIG. 2 shows a solid state laser apparatus for producing a scanning laser beam for the machine of FIG. 1.

Optical system module 14 is shown in detail in FIG. 2 where a solid-state laser chip and a collimating lens are housed in assembly 100. Laser beam 15 passes from assembly 100 through cylindrical lens 101 to a rotating mirror 102 which has a plurality of facets such as facet 103 about its periphery. The laser beam is reflected from a single facet at a time in such a manner as to scan through an angle Θ. As each succeeding facet of the rotating mirror 102 rotates into position to receive beam 15, another scan through the angle Θ begins. Upon reflection from the rotating mirror facet, the laser beam is passed through assembly 104 at which a toroidal lens and a spherical lens are used to finally shape the beam and to focus it on the photoreceptive surface 12 shown in FIG. 1. A beam fold mirror 105 is shown in both FIGS. 1 and 2 illustrating the final folding mechanism to direct the laser beam to the photoreceptive surface 12. Motor 106 is provided to drive the rotating mirror 102 which a start-of-scan mirror 107 is provided to direct the laser beam to a start-of-scan detector 108.

It should be noted that a single scan line on photoreceptive material 12 is produced by the reflection of the laser beam across a single facet on rotating mirror 102. The scan line is comprised of a succession of overlapping picture elements (pels) which may be, for example, 240 pels per inch. In such a case, each square inch on the phtotoconductor would carry 240×240 pels. The photoreceptor may be scanned from either left or right, the scan can proceed from top to bottom, or bottom to top depending upon the particular implementation in the machine. Finally, the produce a positive image, the light beam is modulated to print the background while in a negative system the laser beam is modulated to produce the printing.

Figure 3:
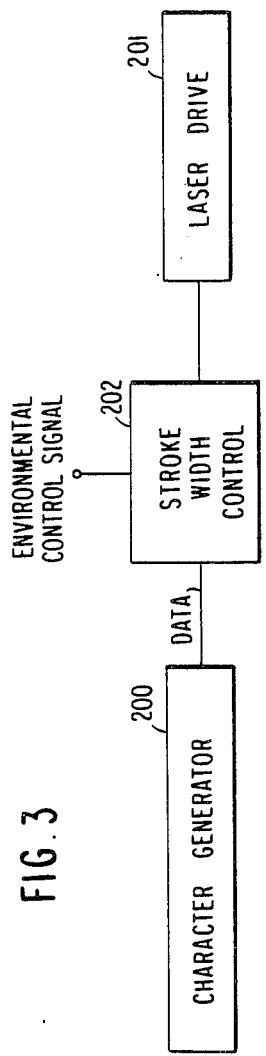
FIG. 3 is a block diagram showing the position of the compensation circuitry in accordance with the invention.

FIG. 3 is a block diagram showing the position of the circuit components to compensate the printed image according to the invention and is directed to an embodiment for use with electrophotographic laser printers shown in FIGS. 1 and 2. The character generator 200 provides signals to modulate the laser beam 15 (FIG. 2) to provide the desired characters. Data from the character generator is provided to laser drive circuitry 201. As shown in FIG. 3, the stroke width control circuit 202 is located between the character generator 200 and the laser drive circuitry so that the image data can be compensated for environmental variations prior to being pressed on the laser drive circuitry 201.

Figure 4:
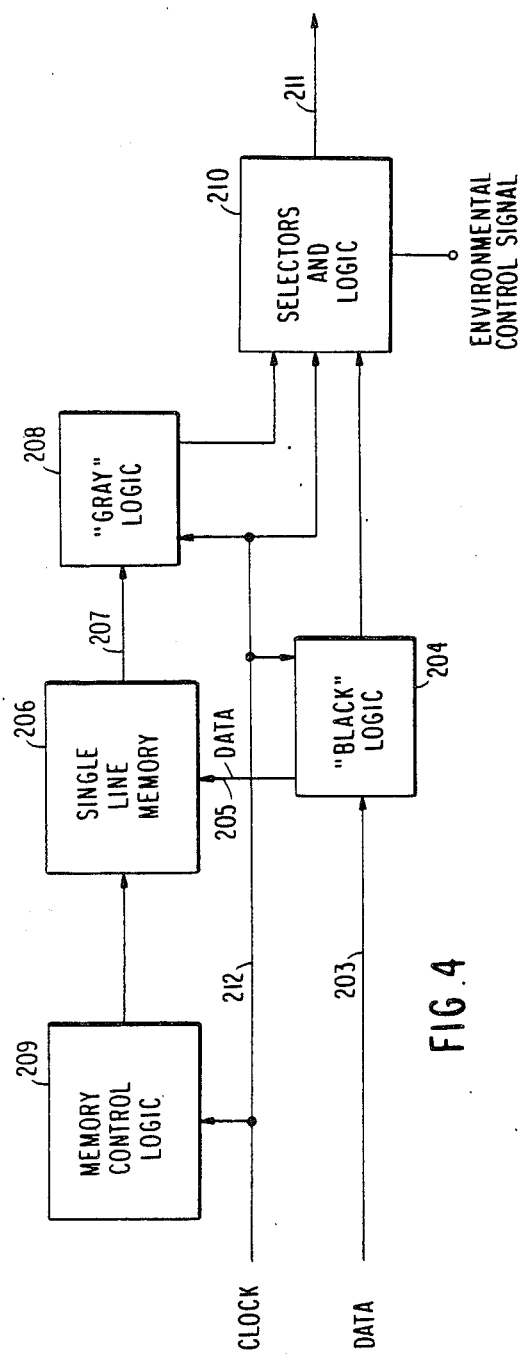
FIG. 4 is a block diagram of the compensation circuitry of FIG. 3.

FIG. 4 is a more detailed block diagram of the stroke width control circuitry 202. In FIG. 4 incoming data from the character generator is received on a line 203 as an input to logic circuit 204. In the logic circuit 204, the incoming data is analyzed to identify the white/black and black/white transitions corresponding to any single pel data. Data from the character generator is fed from the logic circuit 204 over the line 205 to a memory 206. The data is read out of memory 206 over line 207 to a gray logic circuit 208 so as to identify potential gray exposure position for single pel lines running in a direction parallel to the scan. Data stored in memory 206 is read out under the control of logic 209. The selector and logic circuit 210 uses the information provided to it by the other circuitry of FIG. 4 as well as the input from the environmental control signal so as to provide the desired quantum of enhancement to the identified locations in relation to the existing environmental control signal. The output of the selectors and logic circuit 210 is sent to the laser drive circuitry 201; the various logic circuits in FIG. 4 are clocked by pulses received on line 212.

Figure 5A:
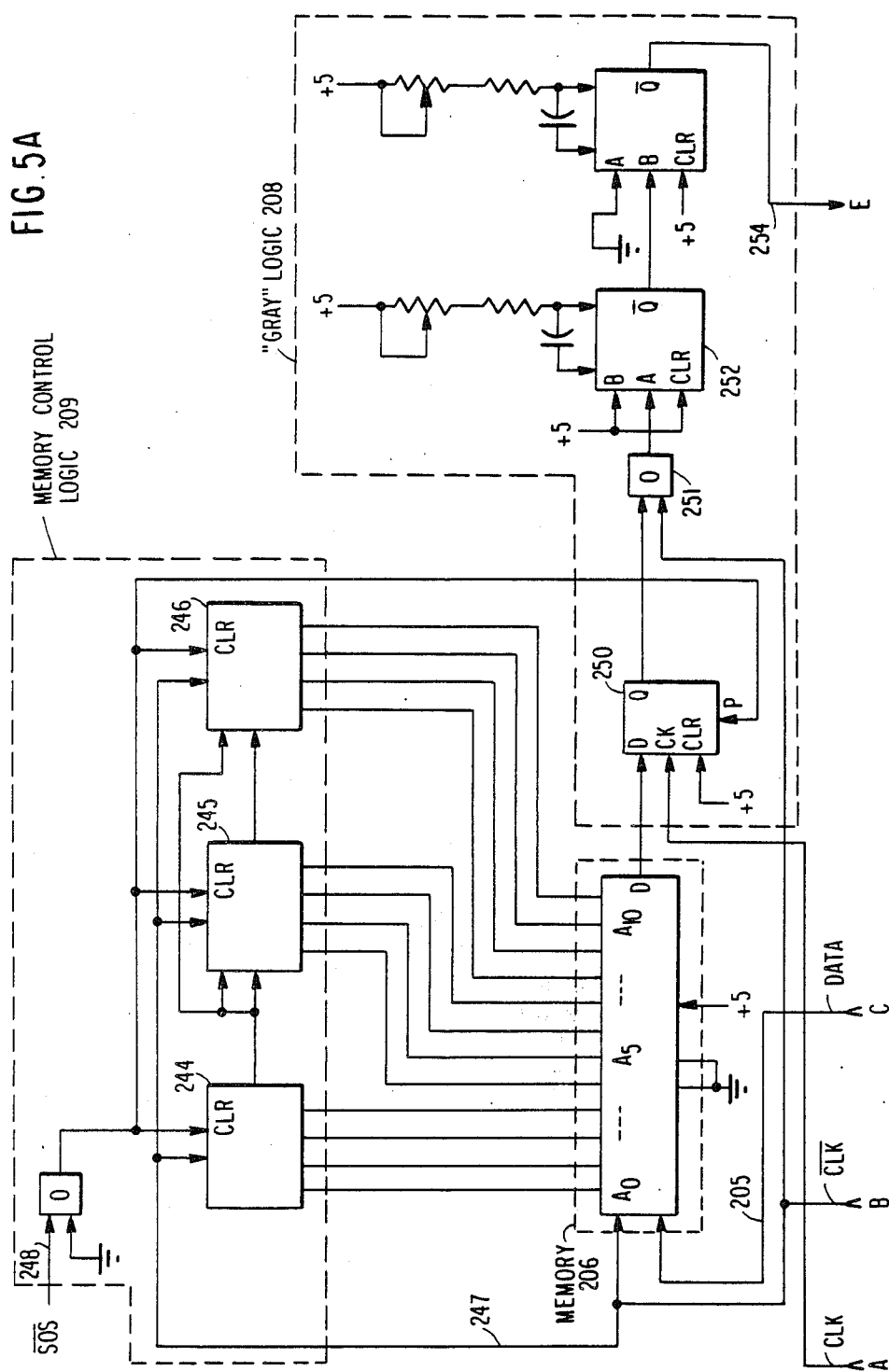
FIGS. 5A, 5B and 5C is a detailed circuit diagram of a particular embodiment of the compensation circuitry.
Figure 5B:
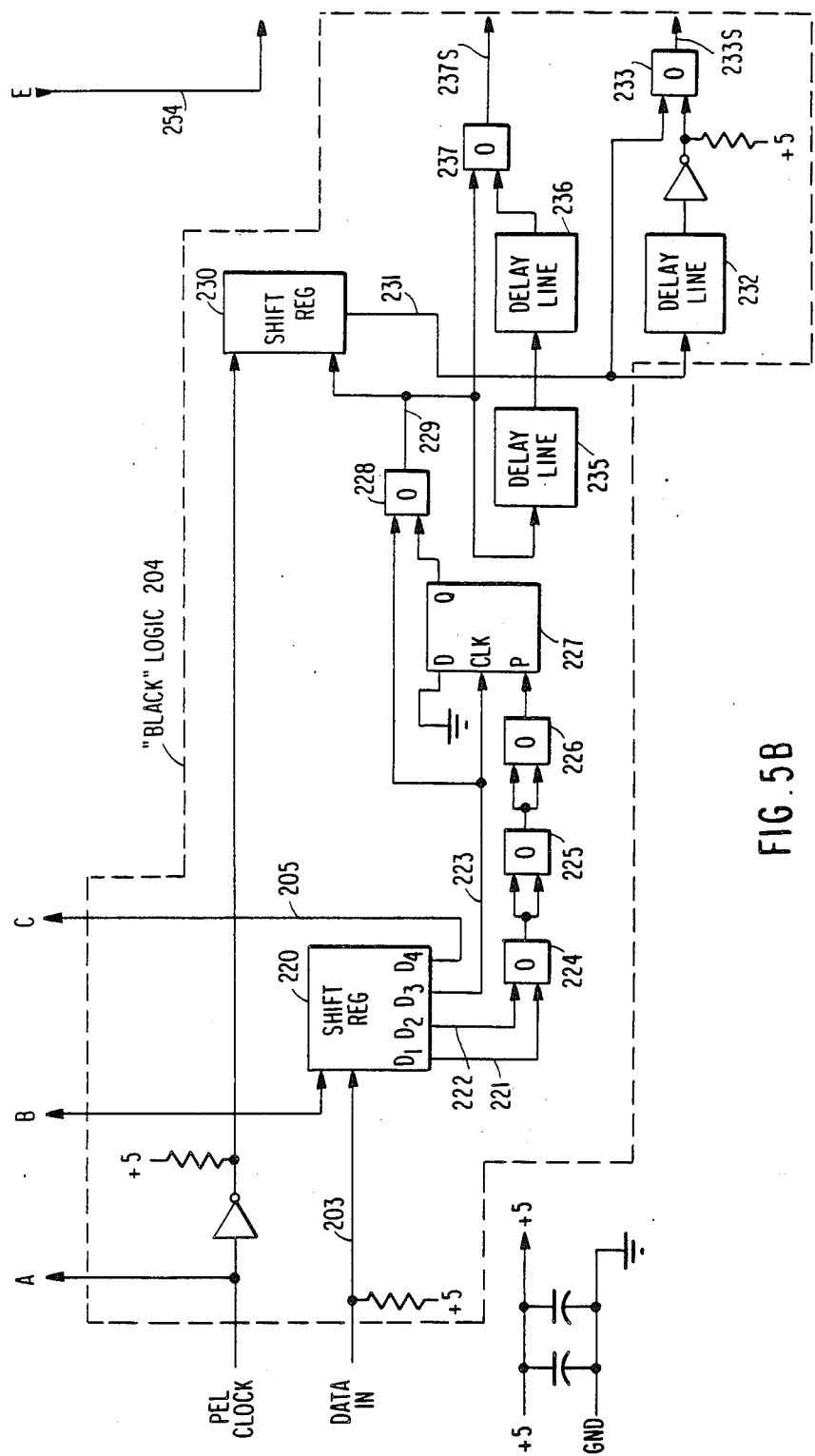
Figure 5C:
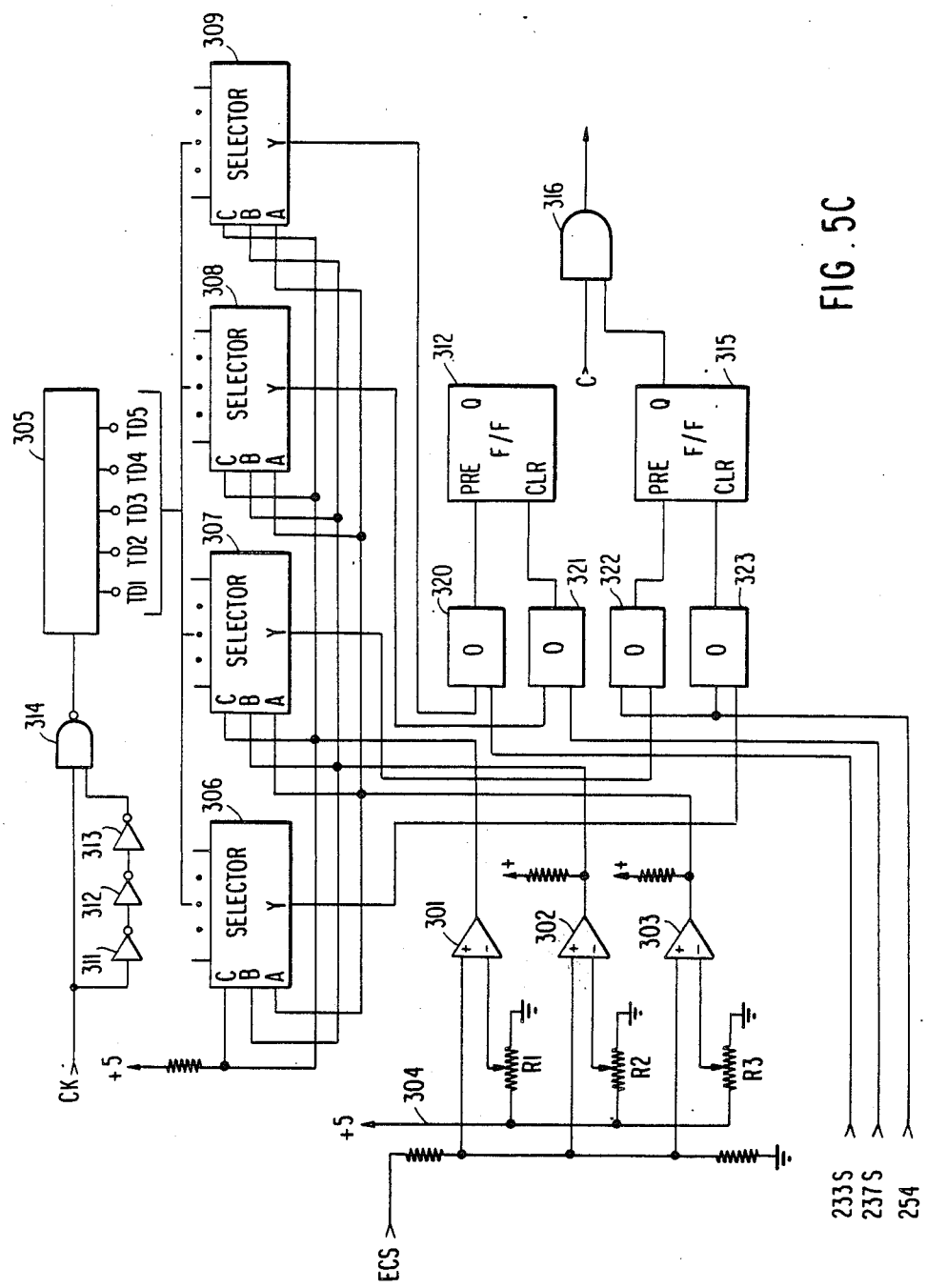

FIG. 5, comprising FIGS. 5A, 5B and 5C, is a detailed circuit diagram to implement the block diagram shown in FIG. 4. In FIG. 5B, data signals received from the character generator 200 (FIG. 3) on line 203 and are passed into shift register 220. Output signals from shift register 220 are provided on lines 221, 222, 223 and 205. The data appearing on these four lines are identical but are removed in time by one clock pulse each. Note that line 205 is connected to the gray logic circuit and passes data from the character generator to the single line memory 206. In the "black logic" circuit 204, data signals on line 221 are passed to an OR circuit 224 where they are added to data signals on line 222. After an appropriate delay provided by OR circuits 225 and 226, the output of OR circuit 226 is fed to the preset input on latch circuit 227. The output signal from latch 227 is fed to an OR circuit 228 where the signal is added to the data signals on line 223. The output of circuit 228 is fed over line 229 to the shift register 230 and from there over line 231 to a time delay circuit 232. After an appropriate time delay, the signals are then added to the output of shift register 230 at OR gate 233; the output of the gate 233 is referred to as 233S, and as will be described hereinafter identifies trailing black locations.

The output signals of OR gate 228, appearing on line 229, are also connected to a delay circuit 235 and from there to variable delay circuit 236. The output signals of variable delay circuit 236 are fed to OR gate 237 where the signals are added to the output signals of OR gate 228 appearing on line 229. The output signals of OR gate 237 will be referred to as 237S, and as will be described hereinafter identify a leading black location.

For the gray logic circuit 208, note that data signals from the character generator are supplied over line 205 to memory 206. Memory circuit 206 is sequentially addressed by the memory control logic 209 which includes counters 244, 245 and 246. These counters are clocked by the complement of the clock signal appearing on line 247 which also clocks data on line 205 into memory 206. As data signals are sequentially read into the memory 206, data signals from the preceding line are read out into latch circuit 250. Next the data signals are sent to OR circuit 251 where the signals are added to the complement of the clock signal. The output of OR circuit 251 is fed to a single shot circuit 252. The output of circuit 252 is fed to a second single shot circuit 253. The output of circuit 253 are "gray" pulse locations which identify the center of the pel period corresponding to the gray locations. The output signals appearing on line 254 are referred to by that designation and identify gray stroke locations.

As described in the '264 patent the logic of FIGS. 5A and 5B serve to identify the leading and trailing edges of print pulses for single pel lines perpendicular to the scan direction at 237S and 233S, respectively. On the other hand, the output at 254 identifies gray exposure positions (adjacent single pel lines parallel to the scan direction). These are, collectively, compensation locations in accordance with the invention. For a more detailed description of the logic of FIGS. 5A and 5B, see the '264 patent.

Note that at the beginning of each scan line the memory control logic is initialized by the complement of the start-of-scan signal appearing on line 248.

THE COMPENSATION CIRCUIT

As has been indicated above the circuitry of FIGS. 5A/5B provides for identifying those time periods (or compensation locations) at which compensation can be provided (particularly the gray exposure position, leading black and trailing black). These times are identified by pulses respectively on the conductors 254, 237S and 233S. The manner in which compensation is provided at these locations (in time) is effected by the circuitry shown in FIG. 5C. As shown in Fig. 5C, a trio of comparators 301, 302 and 303 have one input connected in common to the environmental control signal (ECS). In the event that the electrostatic probe voltage is employed here, the signal is a voltage in the range of 0-10 volts. A reference voltage source is developed from the conductor 304 coupled to a DC source (+5 volts). The other input of comparator 301 is coupled to a potentiometer R1 which has one terminal grounded and the other terminal connected to the conductor 304. The same arrangement is made for the other input of the comparators 302 and 303 except they are connected respectively to potentiometers R2 and R3. The potentiometers are arranged so that the voltage at the "other input" of the comparators 301-303 are progressively different. Thus for example as the ECS voltage varies (for example as it increases) different ones of the comparators 301-303 will be enabled. The outputs of the comparators are coupled to addressing inputs of a plurality of selectors 306-309. There is one selector for the leading black (308), another selector for the trailing black (309) and one selector for each of the edges (rising and falling) of the gray exposure, selectors 306 and 307.

The other input to each of the selectors is provided by the delay line 305. The input of the delay line 305 originates with the pel clock CK. This signal forms one input to the NAND gate 314. The other input to the NAND gate 314 is provided by an inverter 313, which has as an input the output of inverter 312, which has as an input the output of inverter 311, which in turn is driven by the signal CK. The function of the inverters 311-313 is to both invert the signal CK and to delay it somewhat; the delay is selected so that the output of NAND gate 314 is a narrow pulse (the width of the pulse is determined by the delay interposed by the inverters 311-313). Referring briefly to FIG. 6, the first line thereof illustrates the signal CK, merely a regularly occurring clock signal of approximately 50% duty cycle. The output of the inverter 313 is shown on the second line ($\overline{CKD}$). The output of the NAND gate is the signal TDO, and as can be seen, it has a pulse repetition rate equal to CK but is relatively narrow. The delay line 305 has a plurality of output taps (TD1-TD5 are shown) at which progressively delayed versions of TDO are available. FIG. 6 shows the waveforms available at TD1-TD5 in relation to each other and to CK. The trio of comparators 301-303 is merely an analog to digital converter (and of course other analog to digital converters of greater or less resolution could be used in lieu of the three comparators shown in FIG. 5C). The addressing for the selectors 306-309 is derived from the output of the analog to digital converter (the comparators 301-303), and the function of the selectors 306-309 is to select that pulse to its inputs (TD1-TD5) determined by its addessing input. In this fashion, each of the selectors 306-309 select one of its plural inputs determined by the most significant addressing input which is active, where the C input is the most significant and the A input is the least significant. The three addressing inputs can select and output one of four input pulses. A plurality of OR gates serve to couple the outputs of the selectors 306-309 (and several other input signals which will be described) to a pair of flip flops. More particularly, OR gate 320 receives an input from selector 309, OR gate 321 receives an input from selector 308. The other input to OR gate 320 is the signal 233S (identifying the trailing black position) and the other input to OR gate 321 in the signal 237S (identifying the leading black position).

Each of the selectors 306-309 is connected to four of the five outputs of the delay line 305. The fact that the selector is capable of receiving four inputs and the delay line has five available outputs underlines (by illustration) the fact that different selectors may receive different outputs from the delay line 305. Which outputs each of the selector receives is determined by the function of that selector. The three addressing inputs to each selector is capable of selecting one of four inputs; those skilled in the art should understand that the number of comparators may be increased, or a different analog to digital converter may be employed which is capable of finer resolution than that shown in FIG. 5C and likewise the number of inputs to each selector is limited only the resolution of its addressing input.

Referring now to the line of FIG. 6 identified as S1, this line identifies a typical gray exposure position pulse such as is received over line 254 and which provides inputs to the OR gates 322, 323. The other inputs to these OR gates are provided by the output of selectors 306 and 307. The output of OR gate 322 provides the presetting input to the flip flop 315 whereas the output of OR gate 323 provides the clearing input to the flip flop 315. Line FF315 of FIG. 6 shows the Q output of flip flop 315 which defines the location of a particular gray pulse corresponding to the gray pulse position identified in line S1 of FIG. 6. This particular gray pulse has a leading transition (falling) and a trailing transition (rising). The leading transition is determined by the output of OR gate 323. The transition in the output of OR gate 323 is determined by the output of selector 306 (since the appearance of the gray exposure pulse —S-1—means that the high output of the OR gate is maintained solely by the output of the selector 306). Since the input to the selector 306 is provided by the narrow pulses from the delay line 305 (which differ only in their phase position) the addressing input to the selector 306 determines the falling transition of FF315Q, and of course that addressing input is determined by the output of the comparators 301-303. In this fashion the leading transition of the gray pulse is determined by the output of the comparators 301-303. In the similar fashion the trailing transition of the gray pulse is determined by the output of OR gate 322. OR gate 322, once the gray pel pulse (S1) appears, is maintained high solely by the output of the selector 307. As a result, when the selector output falls, the output of OR gate 322 will fall to create the falling transition of FF315Q. The output at selector 307 will fall based on the timing of the selected pulse which is output by the selector; of course this selection is determined by the addressing inputs which are in turn determined by the output of the comparators 301-303 and which in turn is controlled by the magnitude of the ECS (environmental control signal). It should be apparent to those skilled in the art that while in the example being described the delay line 305 has only five output pulses per cycle, many more such output pulses could be provided within the spirit and scope of the invention, which could be selected among so long as the resolution of the analog to digital converter (the comparators 301-303) was sufficient.

In a similar fashion the output of flip flop 312 (FF312Q) is determined by its respective clearing and presetting inputs which in turn are derived from the gates 321 and 320, respectively. The C line of FIG. 6 shows a typical black data pulse which forms one input to the gate 316. The line 237S identifies the leading black position and the line 233S identifies the trailing black position. These are respectively inputs to gates 321 and 320. Once the pulse 237S (leading edge) arrives, the output of gate 321 is maintained high solely by the output of selector 308; and thus when the output of selector 308 falls, so will the output of gate 321. As the output of gate 321 falls, so will the output of FF312Q. Thus, the transition in the output of selector 308 determines the leading transition in the black pulse, and in an entirely similar fashion to the determination of the leading and trailing edges of the gray pulse, so the leading edge of the black pulse is determined by the addressing inputs to the selection which in turn are derived from the level of the ECS signal.

Once the trailing black pulse appears (233S) it is the output of selector 309 which maintains the output of gate 320 high. As a consequence, when the output of selector 309 falls, so will the output of gate 220. When the output of gate 320 falls, the flip flop 312 undergoes a transition which forms the trailing transition of the black pulse. In this fashion, the output of selector 309 determines the location or timing of the trailing transition of the black pulse. This transition in turn is determined by the addressing inputs to the selector 309 which are ultimately derived from the value of the ECS.

Accordingly, the foregoing description has illustrated how the circuitry of FIGS. 5A and 5B analyzes the print data and determines gray exposure position and black pel positions related to single pel lines. The circuitry of FIG. 5C (described in connection with FIG. 6) illustrates how the leading and trailing transition of the gray pulse can be altered in light of environmental variations, as represented by the value of ECS. Likewise, the timing or location of the black pulse transitions (both leading and trailing) is also determined by environmental conditions as represented by ECS. The line S8 of FIG. 6 shows a typical output of gate 316 which in the example shown in FIG. 6 includes both a gray pulse (from FF315Q) and a black pulse of controlled width (FF312Q). It should be apparent that in the absence of identification of compensation locations, the raw print data flows directly through the gate 316 in unmodified form.

Furthermore, it should also be apparent that the present invention providing compensation for environmental variations can also be used to compensate enhanced print data, thus data which has been enhanced in accordance with the teachings of the '264 patent.

While the logic circuitry focuses on single pel lines (perpendicular to or parallel to the scan direction) it should be apparent that by modifying the circuits of FIGS. 5A and B, compensation could be provided for double pel lines, etc. Furthermore, patterns other than thin (single or double pel) lines are also subject to environmental variations. One such pattern is a diagonal line. Diagonal lines (lines at an angle to both the scan lines and lines perpendicular thereto) are generated discretely and thus have the appearance of a staircase. To smooth or edge enhance the staircase to produce the effect of a more nearly smooth diagonal line, the circuitry of the co-pending application can be used. This circuitry uses pattern recognition techniques to identify the staircase pattern and to "fill" in the edges. This enhancement can also have compensation provided by use of the invention. It should furthermore be apparent that environment compensation can be effected for almost any type of pattern so long as data analysis (or pattern recognition) techniques are used to identify appropriate compensation locations.

Having thus described our invention, what we claim as new, and desire to secure by Letters Patent is:

1. An apparatus for modifying print data in an electro-photographic printer to compensate for environmental variations which would otherwise result in print quality variations comprising:
   means for developing a series of clock pulses of varying phase displacement;
   selector means responsive to at least some of said clock pulses and an addressing input for selecting and outputting selected of said pulses;
   means responsive to a signal representing said environmental variations for developing an addressing input for said selector means; and
   logic means responsive to said print data and to said selected pulses for producing modified print data signals.

2. The apparatus of claim 1 which further includes analysis means responsive to said print data for identifying print data compensation locations; and
   means coupling signals representing said print data compensation locations to said logic means.

3. The apparatus of claim 1 wherein said selector means comprises a separate selector for each transition in said modified print data;
   a gate for each said selector with one input coupled to an output of said selector;
   each of said gates further responsive to a different print compensation location signal; and
   means responsive to an output of said gates for developing said modified print data.

4. The apparatus of claim 3 wherein said logic means further comprises a pair of flip flops, each with a pair of inputs, each of said inputs coupled to a different output of said gates; and
   a further gate with an input from an output of each of said flip flops for producing said modified print data.

5. The apparatus of claim 3 wherein said means for developing develops N clock pulses, where N is a non-unity integer, and wherein each said selector is responsive to less than said N clock pulses.

6. An improved electro-photographic printer including stroke width control in at least one of the following respects:
   (1) widening a fine line parallel to a scan direction by generating non-data representing pulses to add an adjacent gray exposure, or
   (2) widening a fine line perpendicular to a scan direction by lengthening a print pulse at a leading edge, or
   (3) widening a fine line perpendicular to a scan direction by lengthening a print pulse at a trailing edge,
   wherein the improvement comprises means for compensating for environmental variations comprising:
   means for developing a series of clock pulses of varying phase displacement;
   selector means responsive to at least some of said series of clock pulses and an addressing input for selecting and outputting selected of said pulses,
   means responsive to a signal representing said environmental variations for developing said addressing input for said selector means; and logic means responsive to print data enhancement representing signals and to said selected pulses for producing modified print data signals.

7. The apparatus of claim 1 or 6 in which said logic means comprises:
   analysis means responsive to said print data for generating print compensation location signals;
   bistable circuit means responsive to said print compensation location signals and to said selected pulses to generate a pulse with a duration dependent on selected of said pulses; and
   means for combining said print data and an output of said bistable circuit means.

8. The apparatus of claim 7 wherein said bistable circuit means includes:
   a pair of OR gates each coupled to an output from a different selector, and also coupled to said print compensation location signals;
   a first flip flop with a preset input coupled to an output of one of said OR gates and a clear input coupled to another of said OR gates.

9. The apparatus of claim 8 in which said bistable circuit means further includes:
   a second pair of OR gates each coupled to an output from a different selector and also coupled to said print compensation location signals;
   a second flip flop with a preset input coupled to an output of one of said second pair of OR gates and a clear input coupled to another of said second pair of OR gates.

10. An electrophotographic printing machine comprising:
    drive means;
    movable carrier means driven by said drive means;
    photoreceptive material mounted on said movable carrier means for cyclic movement through electrophotographic process stations;
    charge corona means located at a first station for placing a relatively uniform electrostatic charge on the surface of said photoreceptive material;
    exposure means located at a second station for selectively discharging the charged photoreceptive material to cause the formation of a latent image on said material;
    toner for developing said image;
    developer means located at a third station for applying said toner to said image to produce a developed image;
    image receiving material;
    transfer means located at a fourth station for transferring and developed image from said photoreceptive material to said image receiving material;
    paper storage means for holding a supply of image receiving material;
    a finishing station;
    paper forwarding means for serially moving image receiving material from said storage means through the transfer station to said finishing station;
    control means for operating said exposure means, said control means comprising:
    a character generator for producing data signals to drive said exposure means to produce the desired image on said photoreceptive material; and
    compensation means for modifying certain of said data signals before presentation of signals to said exposure means to control image lines on said photoreceptor;
    said compensation means responsive to an environmental signal and to said data signals for producing modified data signals to counteract an effect of environmental variations.

11. In an electrophotograhic printer which produces images in response to print data and which includes means for enhancing said images by widening fine lines either parallel to or perpendicular to a scan line, a method of compensating for environmental effects which otherwise would produce print quality variations comprising the steps of:
    developing a series of phase displaced clock pulses,
    developing compensation location identifying signals in response to said print data,
    selecting, in response to environment variations that would otherwise result in print quality variations, selected of said series of pulses, and
    modifying said print data signals with said selected clock pulses at compensation locations to compensate for said environmental variations.

* * * * *

UNITED STATES PATENT AND TRADEMARK OFFICE
CERTIFICATE OF CORRECTION

PATENT NO. : 4,681,424

DATED : July 21, 1987

INVENTOR(S) : Kantor et al

It is certified that error appears in the above-identified patent and that said Letters Patent is hereby corrected as shown below:

Col. 1, line 55, change "inche" to -inch-;

line 56, change "increase" to -increases-;

line 66, change "graph" to -gray-.

Col. 2, line 19, change "and" to -from-.

Col. 3, lines 22-23, delete "In order to increase when the laser is turned on."

Col. 4, line 3, change "respect" to -respects-.

Col. 5, line 8, change "negativie" to -negative-.

Col. 6, line 21, delete "application".

Col. 7, line 2, change "about" to -around-;

line 27, change "the produce" to -to produce-;

line 68, after "signals" add -are-.

Col. 9, line 28, change "of" to -to-;

line 44, change "TDO" to -TD0-;

line 48, change "TDO" to -TD0-;

line 57, change "pulse to" to -pulse of-;

UNITED STATES PATENT AND TRADEMARK OFFICE
CERTIFICATE OF CORRECTION

PATENT NO. : 4,681,424

DATED : July 21, 1987

INVENTOR(S) : Kantor et al

It is certified that error appears in the above-identified patent and that said Letters Patent is hereby corrected as shown below:

line 58, change "addessing" to --addressing--;

line 59, change "select" to --selects--.

Col. 10, line 19, after "only" add --by--.

Col. 14, line 7, change "and" to --said--;

line 38, change "environment" to --environmental--.

Signed and Sealed this

First Day of December, 1987

*Attest:*

DONALD J. QUIGG

*Attesting Officer*  *Commissioner of Patents and Trademarks*